United States Patent [19]

Porz et al.

[11] Patent Number: 5,085,842
[45] Date of Patent: Feb. 4, 1992

[54] PROCESS FOR SCAVENGING HYDROGEN SULFIDE USING GLYOXAL

[75] Inventors: Christoph Porz, Bonn; Bernd Christensen, Liederbach; Elena Kyaw-Naing, Schwalbach; Walter Gulden, Hofheim am Taunus; Erich F. Paulus, Eppstein, all of Fed. Rep. of Germany

[73] Assignee: Hoechst Aktiengesellschaft, Frankfurt am Main, Fed. Rep. of Germany

[21] Appl. No.: 644,843

[22] Filed: Jan. 23, 1991

[30] Foreign Application Priority Data

Jan. 25, 1990 [DE] Fed. Rep. of Germany ....... 4002132

[51] Int. Cl.$^5$ .......................... B01D 53/14; C07C 7/11
[52] U.S. Cl. ...................................... 423/226; 585/864
[58] Field of Search .................. 423/226, 243, 245.2; 568/20; 585/864

[56] References Cited

U.S. PATENT DOCUMENTS

| | | | |
|---|---|---|---|
| 1,991,765 | 2/1935 | Marks | 568/75 |
| 2,594,379 | 4/1952 | Barch | 568/20 |
| 2,994,585 | 8/1961 | Marcheguet et al. | 423/243 |
| 3,514,410 | 5/1970 | Engle et al. | 252/146 |
| 3,585,069 | 6/1971 | Owsley et al. | 252/146 |
| 3,669,613 | 5/1972 | Knox et al. | 252/146 |
| 4,083,945 | 4/1978 | Fenton et al. | 423/226 |
| 4,220,550 | 9/1980 | Frenier et al. | 252/8.555 |
| 4,289,639 | 9/1981 | Buske | 252/142 |
| 4,310,435 | 1/1982 | Frenier | 252/181 |
| 4,680,127 | 7/1987 | Edmondson | 423/226 |
| 4,748,011 | 5/1988 | Baize | 423/228 |
| 4,978,512 | 12/1990 | Dillon | 423/226 |

FOREIGN PATENT DOCUMENTS 1-70062  3/1989  Japan.

OTHER PUBLICATIONS

Sueyoshi et al., *Chemical Abstracts*, vol. 79, No. 149292k (1973).
N. Kharasch, ed., "Organic Sulfur Compounds", vol. I, New York: Pergamon Press (1961), pp. 134–145.

*Primary Examiner*—Michael Lewis
*Assistant Examiner*—Peter T. DiMauro

[57] ABSTRACT

A process for scavenging hydrogen sulfide from gases, in which the hydrogen sulfide-containing gas is introduced into an aqueous glyoxal solution of at least 15% by weight strength at a pH of a solution of 5 to 11 until the molar ratio of glyoxal to hydrogen sulfide is 3 to 2. The solid reaction product obtained in this way, which contains the hydrogen sulfide in bound form, is separated off. Owing to its stability and insolubility in acids and bases, it can be disposed of without problems.

11 Claims, No Drawings

PROCESS FOR SCAVENGING HYDROGEN SULFIDE USING GLYOXAL

DESCRIPTION

The invention relates to a process for scavenging hydrogen sulfide from gases using glyoxal. The presence of hydrogen sulfide in crude natural gas, in crude petroleum gas or in synthesis gas is undesirable for various reasons. Hydrogen sulfide is highly toxic, so that a widespread requirement of the purity of natural gas for consumer networks is a content of at most 6 mg/m$^3$ of hydrogen sulfide. During combustion, hydrogen sulfiderich oils or natural gases additionally produce heavy environmental pollution owing to the resultant sulfur dioxide. In cracking plants, the hydrogen sulfide acts as a contact poison for the catalysts. In the end, it leads to hydrogen-induced brittleness in carbon steels and to stress corrosion cracking in more highly alloyed materials. For the reasons mentioned, it has been attempted, as far as possible, to wash out, or chemically convert, the hydrogen sulfide from the natural gas or oil.

There thus exist various physical and chemical processes for the purification of crude gases which, depending on the content of hydrogen sulfide and impurities in the crude gases and the requirements for the purity of the final product, are economical to different extents. The hydrogen sulfide content in oil is in the ppm range, while in natural gas 20% hydrogen sulfide and more can be present. The recovery of elemental sulfur from hydrogen sulfide-rich natural gas sources by catalytic oxidation, by partial oxidation to SO$_2$ and subsequent disproportionation (Claus process) or by oxidation with nitrite (sulfo-check process) plays an important role, especially in Europe.

If reduction of hydrogen sulfide to sulfur is not economical, for example because the hydrogen sulfide content in the recovered sulfur are lacking, so-called chemical scavenger systems are used. Three groups of chemicals are employed [Review "H$_2$S-Scavenging" in Oil and Gas Journal, Jan. 1989, 51–55 (Part 1); 81–82 (Part 2); Feb. 1989, 45–48 (Part 3); 90–91 (Part 4)]: Aldehydes, metal oxides and amines (U.S. Pat No. 4,808,765).

The use of aldehydes for scavenging hydrogen sulfide has been known for a relatively long time. Thus, in U.S. Pat. No. 1,991,765, the reaction of hydrogen sulfide and an aldehyde between pH values of 2–12 at temperatures of 20–100° C. is described. In particular, at pH values of 2 or less the reaction of formaldehyde, glyoxal, acrolein and other aldehydes is repeatedly described (for example U.S. Pat. Nos. 2,606,873, 3,514,410, 3,585,069, 3,669,613, 4,220,500, 4,289,639, 4,310,435).

In practice, formaldehyde solutions have hitherto primarily been employed, water-insoluble trithiane and, as by-products, very unpleasant-smelling alkylmercaptans being formed [Review "H$_2$S-Scavenging" in Oil and Gas Journal, Jan. 1989, 51–55 (Part 1); 81–82 (Part 2); Feb. 1989, 45–48 (Part 3); 90–91 (Part 4)]. Trithiane is not stable, but decomposes easily into the starting materials. Using a scavenger based on formaldehyde, special safety precautions therefore have to be taken owing to the odor and the toxicity, both of hydrogen sulfide and of formaldehyde.

As a consequence of the disadvantages of formaldehyde described, other aldehydes or aldehyde mixtures are increasingly employed today. Glyoxal, in particular, has found its way into the oil and natural gas industry as a hydrogen sulfide scavenger. U.S. Pat. No. 4,680,127 describes a process for reducing the hydrogen sulfide content in aqueous or wet gaseous media by addition of very small amounts of glyoxal or glyoxal in combination with other aldehydes. However, an essential disadvantage of this process is that the addition products of glyoxal and hydrogen sulfide formed in this case are watersoluble and only stable in the alkaline range (pH=9). In the acidic pH conditions prevailing in practice (pH=4.5–5.5), these addition products are no longer stable and decompose with the release of hydrogen sulfide.

A scavenger system, in particular for toxic substances, such as hydrogen sulfide, however, must in addition to the industrial feasibility also yield final products which are water-insoluble in the acidic and basic range, which can be handled without risk and, for reasons of environmental protection, must be disposable or reutilizable.

Surprisingly, it has now been found that on introducing gases containing hydrogen sulfide into an aqueous glyoxal solution having a pH of 5–11, a stable product which is insoluble in water and even in acids (pH 1) is formed if the glyoxal solution has a concentration of at least 15% by weight.

The invention thus relates to a process for scavenging hydrogen sulfide from gases, in particular from crude natural gas, crude petroleum gas or synthesis gases, in which the hydrogen sulfide-containing gas is passed into an aqueous glyoxal solution of at least 15% by weight. The introduction is expediently carried out until the molar ratio of glyoxal to hydrogen sulfide is 3 to 2. The solid reaction product obtained in this way, which contains the hydrogen sulfide in bound form, can be separated off without problems and disposed of.

The reaction product is odor-free, acid- and alkaliresistant (up to pH 9) and heat-stable, and can be filtered off without problems and dried, for example in vacuo at 60° C. No decomposition occurs in 2N hydrochloric acid. The product is moreover insoluble in most customary organic solvents, with the exception of dimethyl sulfoxide, dimethylformamide and dimethylacetamide. The product is also stable and insoluble in the alkaline range up to pH 9, and the product only decomposes on treating with 2N sodium hydroxide solution with the release of hydrogen sulfide. The precipitated product thus has a completely different structure to the addition products of glyoxal and hydrogen sulfide hitherto obtained with dilute glyoxal solutions, and can be disposed of without problems.

A commercial 40% strength glyoxal solution, which has been adjusted to the pH range indicated, is in general used as the scavenger solution. In general, the glyoxal content 50% by weight should not be exceeded in the solution, and the preferred concentration range is 25 to 45% by weight.

The pH range of the glyoxal solution is expediently 5 to 11, preferably 5.5 to 8, in particular 6 to 7. The introduction of gas usually begins with an alkaline glyoxal solution (pH 8–10). In the course of the process, the pH moves into the acidic range (pH 5.5 to 7.0). The reaction is carried out at customary working temperatures, i.e. usually 10 to 70° C.

Customary additives, in particular anticorrosion agents, such as, for example, quaternary ammonium salts, can additionally be added to the scavenger solution during natural gas extraction.

EXAMPLE $H_2S$ scavenging using 40% strength glyoxal solution 200 g (1.38 mol) of 40% strength glyoxal solution are initially introduced into a 1 liter reaction vessel fitted with a stirrer, gas introduction tube and temperature probe and adjusted to pH 9 using 50% strength sodium hydroxide solution. $H_2S$ gas is introduced from a gas cylinder into the initially introduced glyoxal solution at an initial temperature of 32° C. until it is saturated, the pH falling into the acidic range. The heat of reaction liberated per mol of $H_2S$ here is $-55$ kJ, however cooling is not necessary. Altogether, 31 g (0.93 mol) of $H_2S$ are absorbed. The glyoxal:$H_2S$ condensation product (molar ratio 3:2) precipitates from the aqueous solution as a white solid. After filtering off and drying in vacuo at 60° C., 88 g of an amorphous alkali-, acid- and water-insoluble powder are obtained, which can be disposed of without problems.

We claim:

1. A purification process for crude natural gas, crude petroleum gas, or synthesis gas containing hydrogen sulfide, which comprises introducing a said hydrogen sulfide-containing gas into an aqueous glyoxal solution of at least 15% by weight strength, a solid precipitated reaction product binding the hydrogen sulfide being obtained and a cleaned gas stream being recovered.

2. The process as claimed in claim 1, wherein at the start of the gas introduction the glyoxal solution has a pH of 5 to 11,.

3. The process as claimed in claim 1 wherein the concentration of the glyoxal solution is 15 to 50 by weight.

4. The process as claimed in claim 1, wherein the hydrogen sulfide-containing gas is introduced until the molar ratio of glyoxal to hydrogen sulfide is 3 to 2.

5. The process is claimed in claim 1, wherein the precipitated reaction product is separated off from the glyoxal solution.

6. The process as claimed in claim 1, wherein additives useful in natural gas extraction are added to the aqueous glyoxal solution.

7. The process as claimed in claim 1, wherein at the start of the gas introduction the glyoxal solution has a pH of 5.5 to 8.

8. The process as claimed in claim 1, wherein at the start of the gas introduction the glyoxal solution has a pH of 6 to 7.

9. The process as claimed in claim 1, wherein the concentration of the glyoxal solution is 25 to 45% by weight.

10. The process as claimed in claim 1, wherein anti-corrosion agents are added to the aqueous glyoxal solution.

11. The process as claimed in claim 5, wherein said precipitated reaction product is insoluble in acid.

* * * * *